(12) United States Patent
Hiron et al.

(10) Patent No.: US 7,989,017 B2
(45) Date of Patent: *Aug. 2, 2011

(54) CANOLA PROTEIN ISOLATE FUNCTIONALITY II

(75) Inventors: Shelley Hiron, Winnipeg (CA); Ronald W. Martens, Altona (CA); E. Donald Murray, Eden Mills (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 1297 days.

This patent is subject to a terminal disclaimer.

(21) Appl. No.: 11/507,556

(22) Filed: Aug. 22, 2006

(65) Prior Publication Data
US 2006/0286281 A1 Dec. 21, 2006

Related U.S. Application Data

(63) Continuation of application No. 10/493,023, filed on Nov. 4, 2004, now abandoned.

(51) Int. Cl.
*A23J 1/00* (2006.01)

(52) U.S. Cl. ........ 426/656; 424/776; 424/725; 424/400; 424/439; 530/377

(58) Field of Classification Search .................. 426/656; 530/377; 424/776, 725, 400, 439
See application file for complete search history.

(56) References Cited

U.S. PATENT DOCUMENTS

| | | | |
|---|---|---|---|
| 4,169,090 A | 9/1979 | Murray | |
| 4,208,323 A | 6/1980 | Murray | |
| 4,285,862 A | 8/1981 | Murray | |
| 4,418,013 A | 11/1983 | Cameron et al. | |
| 5,844,086 A | 12/1998 | Murray | |
| 6,005,076 A | 12/1999 | Murray | |
| 6,905,713 B2 * | 6/2005 | Diosady et al. | 424/755 |
| 6,992,173 B2 * | 1/2006 | Milanova et al. | 530/377 |
| 7,087,720 B2 * | 8/2006 | Murray et al. | 530/377 |
| 7,625,588 B2 * | 12/2009 | Barker et al. | 424/776 |
| 2003/0125526 A1 * | 7/2003 | Barker et al. | 530/370 |
| 2004/0254353 A1 * | 12/2004 | Barker et al. | 530/377 |
| 2006/0205929 A1 * | 9/2006 | Milanova et al. | 530/422 |
| 2007/0178566 A1 * | 8/2007 | Schweizer et al. | 435/134 |

FOREIGN PATENT DOCUMENTS

| | | |
|---|---|---|
| DE | 202 800 | 10/1983 |
| DE | 202800 | 10/1983 |
| EP | 0 289 183 | 11/1988 |
| EP | 0289183 | 11/1988 |
| GB | 2 077 739 | 12/1981 |
| GB | 2077739 | 12/1981 |
| WO | WO 02/089597 | 11/2002 |
| WO | WO 03/043439 | 5/2003 |

OTHER PUBLICATIONS

Murray, D. 2001. Rapeseed: A potential source of high quality plant protein. Asia Pacific Food Industry: 30-34.
Feit, I.N. and Warrick, C.L. 2003. Inherency in Patent Law. J. Pat. Trade Off. Soc., 85(1): 5-21.
Yew-Min Tzeng et al. Sep. 1, 1988. Preparation of rapeseed protein isolate by sodium hexametaphosphate extraction, ultrafiltration, diafiltration, and ion-exchange. Journal of Food Science, 53(5): 1537-1541.
Micoulovich, T.P. ed. 1991. Vegetable protein. Agropromizdat: 150-155; 359-363; 633-639.
Morris, Charles. 2001. New technology isolates canola protein. Food Engineering.
Murray et al., Rapeseed: a potential global source of high quality plant protein. Apr. 2001, pp. 30-34. XP002207606.
Yew-Min Tzeng et al., Preparation of Rapeseed protein isolate by Sodium Hexametaphosphate Extraction, Ultrafiltration, Diafiltration, and Ion-Exchange. Sep. 1988, pp. 1537-1541. XP000000647.

* cited by examiner

*Primary Examiner* — Anthony Weier
(74) *Attorney, Agent, or Firm* — Michael I. Stewart; Sim & McBurney

(57) ABSTRACT

A canola protein isolate having a protein content of at least about 90 wt % (Nx 6.25) is employed as an at least partial replacement for at least one component providing functionality in a food composition. The canola protein isolate is a blend of canola protein isolate in the form of an amorphous protein mass formed by settling the solid phase of a dispersion of protein micelles and mixing the amorphous mass with concentrated supernatant from the settling step and drying the mixture.

3 Claims, No Drawings

CANOLA PROTEIN ISOLATE FUNCTIONALITY II

REFERENCE TO RELATED APPLICATIONS

This application is a continuation of U.S. patent application Ser. No. 10/493,023 filed Nov. 4, 2004, now abandoned, and claims priority under 35 USC 119(e) from U.S. Patent Applications No. 60/330,479 filed Oct. 23, 2001 and 60/375,711 filed Apr. 29, 2002

FIELD OF INVENTION

The present invention relates to a canola protein isolate and its functionality in a wide range of applications.

BACKGROUND TO THE INVENTION

In U.S. Pat. Nos. 5,844,086 and 6,005,076 ("Murray II"), assigned to the assignee hereof and the disclosures of which are incorporated herein by reference, there is described a process for the isolation of protein isolates from oil seed meal having a significant fat content, including canola oil seed meal having such content. The steps involved in this process include solubilizing proteinaceous material from oil seed meal, which also solubilizes fat in the meal and removing fat from the resulting aqueous protein solution. The aqueous protein solution may be separated from the residual oil seed meal before or after the fat removal step. The defatted protein solution then is concentrated to increase the protein concentration while maintaining the ionic strength substantially constant, after which the concentrated protein solution may be subjected to a further fat removal step. The concentrated protein solution then is diluted to cause the formation of a cloud-like mass of highly aggregated protein molecules as discrete protein droplets in micellar form. The protein micelles are allowed to settle to form an aggregated, coalesced, dense amorphous, sticky gluten-like protein isolate mass, termed "protein micellar mass" or PMM, which is separated from residual aqueous phase and dried.

The protein isolate has a protein content (as determined by Kjeldahl Nx 6.25) of at least about 90 wt %, is substantially undenatured (as determined by differential scanning calorimetry) and has a low residual fat content of less than about 1 wt %. The yield of protein isolate obtained using this procedure, in terms of the proportion of protein extracted from the oil seed meal which is recovered as dried protein isolate was generally less than 40 wt %, typically around 20 wt %.

The procedure described in the aforementioned patents was developed as a modification to and improvement on the procedure for forming a protein isolate from a variety of protein source materials, including oil seeds, as described in U.S. Pat. No. 4,208,323 (Murray IB). The oil seed meals available in 1980, when U.S. Pat. No. 4,208,323 issued, did not have the fat contamination levels of canola oil seed meals available at the time of the Murray II patents, and, as a consequence, the procedure of U.S. Pat. No. 4,208,323 cannot produce from oil seed meals processed according to the Murray II process, proteinaceous materials which have more than 90 wt % protein content. There is no description of any specific experiments in U.S. Pat. No. 4,208,323 carried out using rapeseed (canola) meal as the starting material.

U.S. Pat. No. 4,208,323 itself was designed to be an improvement on the process described in U.S. Pat. Nos. 4,169,090 and 4,285,862 (Murray IA) by the introduction of the concentration step prior to dilution to form the PMM. The latter step served to improve the yield of protein isolate from around 20 wt % for the Murray IA process.

In copending U.S. Patent Applications Ser. No. 60/288,415 filed May 4, 2001, Ser. No. 60/326,987 filed Oct. 5, 2001, Ser. No. 60/331,066 filed Nov. 7, 2001, Ser. No. 60/333,494 filed Nov. 28, 2001, Ser. No. 60/374,801 filed Apr. 24, 2002 and Ser. No. 10/137,391 filed May 3, 2002, assigned to the assignee hereof and the disclosures of which are incorporated herein by reference, there are described further improvements on these prior art protein isolation procedures as they apply to oil seeds to obtain improved yields of dried product protein isolate in terms of the proportion of the protein extracted from the oil seeds which is recovered as protein isolate and to obtain protein isolate of high purity, usually at least about 100 wt % at a Kjeldahl nitrogen (N) conversion rate of Nx 6.25. The procedure is employed particularly to produce a canola protein isolate.

In the procedure described in the aforementioned US Patent Applications, the oil seed meal is extracted with an aqueous food grade salt solution. The resulting protein extract solution, after an initial treatment with pigment adsorbing agent, if desired, is reduced in volume using ultrafiltration membranes to provide a concentrated protein solution having a protein content in excess of about 200 g/L. The concentrated protein solution then is diluted into chilled water having a temperature below about 15° C., resulting in the formation of a white cloud of protein micelles which are allowed to separate. Following removal of the supernatant, the precipitated, viscous sticky mass (PMM) is dried.

In one embodiment of the process described in the aforementioned U.S. Patent Application Ser. No. 60/288,415 as it is applied to canola protein isolate and as described in copending U.S. Patent Applications Ser. Nos. 60/326,987, 60/331,066 60/333,494, 60/374,801 and 10/137,391, the supernatant from the PMM settling step is processed to recover a protein isolate comprising dried protein from the wet PMM and supernatant. This may be effected by initially concentrating the supernatant using ultrafiltration membranes, mixing the concentrated supernatant with the wet PMM and drying the mixture. The resulting canola protein isolate has a high purity of at least about 90 wt % protein, preferably at least about 100 wt %, at a Kjeldahl conversion rate Nx 6.25. This latter product is termed "Puratein" by the applicants.

In copending U.S. Patent Applications Ser. No. 60/331,646 filed Nov. 20, 2001 and Ser. No. 60/383,809 filed May 30, 2002, assigned to the assignee hereof and the disclosure of which are incorporated herein by reference, there is described a continuous process for making canola protein isolates. In accordance therewith, canola oil seed meal is continuously mixed with a food grade salt solution, the mixture is conveyed through a pipe while extracting protein from the canola oil seed meal to form an aqueous protein solution, the aqueous protein solution is continuously separated from residual canola oil seed meal, the aqueous protein solution is continuously conveyed through a selective membrane operation to increase the protein content of the aqueous protein solution to at least about 200 g/L while maintaining the ionic strength substantially constant, the resulting concentrated protein solution is continuously mixed with chilled water to cause the formation of protein micelles, and the protein micelles are continuously permitted to settle while the supernatant is continuously overflowed until the desired amount of protein micellar mass has accumulated in the settling vessel. The protein micellar mass is removed from the settling vessel and may be dried. The protein micellar mass has a protein content of at least about 100 wt % as determined by Kjeldahl nitrogen (Nx 6.25). As in the case of the aforementioned pending United States patent applications, the overflowed supernatant may be proceeded to recover a protein isolate comprising dried protein from the wet PMM and supernatant. This procedure also may be effected on a semi-continuous basis.

As described in copending U.S. Application Ser. No. 60/332,165 filed Apr. 15, 2002, assigned to the assignee hereof and the disclosure of which is incorporated herein by reference, the settled PMM and protein derived from the supernatant have different relative proportions of the 12S, 7S and 2S proteins of canola protein. The PMM derived protein isolate, having a protein content of at least about 90 wt %, preferably at least about 100 wt %, has a protein component content of about 60 to about 98 wt % of 7S protein, about 1 to about 15 wt % of 12S protein and 0 to about 25 wt % of 2S protein. The supernatant-derived canola protein isolate having a protein content of at least about 90 wt %, preferably at least about 100 wt %, has a protein component content of 0 to about 5 wt % of 12S protein, about 5 to about 40 wt % of 7S protein and about 60 to about 95 wt % of 2S protein.

The processing of the supernatant from the PMM settling step to remove a protein isolate comprising dried protein from the wet PMM and supernatant then is a blend of the isolates derived from the respective sources and exhibits a composite protein component content.

Canola is also termed rapeseed or oil seed rape.

SUMMARY OF INVENTION

It has now been found that the high purity blended canola protein isolate produced by the procedure of the aforementioned pending patent applications ("Puratein") has broadly based functionality in food products, unique among proteinaceous materials. The ability to utilize a protein which is vegetable in origin in food products enables truly vegetarian food products to be provided in instances where egg white and/or animal-derived protein have been used in the absence of any available substitute.

In one aspect, the present invention provides, in a food composition comprising a foodstuff and at least one component providing functionality in said food composition, the improvement which comprises at least partially replacing said at least one component by a substantially undenatured canola protein isolate having a protein content of at least about 90 wt %, as determined by Kjeldahl nitrogen ×6.25, on a dry weight basis. The canola protein isolate comprises a blend of:

(1) a first canola protein isolate having a protein content of at least 90 wt % on a dry weight basis and at a Kjeldahl nitrogen conversion of Nx 6.25 and which exhibits a protein profile which is:
about 60 to about 98 wt % of 7S protein
about 1 to about 15 wt % of 12S protein
0 to about 25 wt % of 2S protein, and
(2) a second canola protein isolate having a protein content of at least about 90 wt % on a dry weight basis and a Kjeldahl conversion of Nx 6.25 and which exhibits a protein profile which is:
about 60 to about 95 wt % of 2S protein
about 5 to about 40 wt % of 7S protein
0 to about 5 wt % of 12S protein The first and second protein isolates may be present in said blend in a weight ratio of about 5:95 to about 95:5. The canola protein isolates may be in the form of a blend of an amorphous protein mass formed by settling the solid phase from an aqueous dispersion of protein micelles and mixing said amorphous protein mass with concentrated supernatant from the settling step. The blend generally is utilized in a dried form.

The canola protein isolate may be used in conventional applications of protein isolates, such as protein fortification of processed foods, emulsification of oils in water, body formers in baked foods and foaming agents in products which entrap gases. The canola protein isolate also has functionalities not exhibited by the source material and isoelectric precipitates. The canola protein isolate has certain functionalities in common with the products described in the prior art Murray I patents, including the ability to be formed into protein fibers and the ability to be used as an egg white substitute or extender in food products where egg white is used as a binder. As described herein, the canola protein isolate has other functionalities.

Protein functionality can be categorized into several properties. The following Table I lists these functionalities, food products wherein such protein functionality is provided and protein commonly employed for such purpose:

TABLE I

| Property | Food Product | Protein |
| --- | --- | --- |
| 1. Solubility | Beverages | Egg and whey proteins |
| 2. Viscosity | Dressings, deserts | Gelatin |
| 3. Water binding | Sausages, cakes | Meat protein, egg protein |
| 4. Gelation | Yoghurts, desserts, cheese | Egg and milk proteins, gelatin |
| 5. Cohesion/adhesion | Meats, sausage, pasta | Egg and whey proteins |
| 6. Elasticity | Meats, baked goods | Egg and whey proteins, meat protein |
| 7. Emulsification | Sausages, dressings | Egg and milk proteins |
| 8. Foaming | Toppings, nougats, ice cream | Egg and milk proteins |
| 9. Fat binding | Baked goods, doughnuts | Egg and milk proteins, gluten |
| 10. Film forming | Buns and breads | Egg protein, gluten |
| 11. Fiber forming | Meat analogs | Meat protein |

(* This Table I is derived in part from Food Chemistry, Third Edition, 1996, Ed. Owen Fennema, Marcel Dekkar Inc., page 366).

As may be seen from Table I, egg protein has a wide scope of functionality but not as broad as the canola protein isolate of the present invention. However, the canola protein isolate may be utilized in each of these applications to replace the protein commonly used to provide the specific functional properties. In general, the canola protein isolate can replace or extend the existing protein product, while providing the desired functionality, especially for vegetarian and near vegetarian type products, much more cheaply. In addition, the canola protein isolate has a high quality amino acid profile, bland flavour profile and does not possess detrimental flavour characteristics nor nutritional factors which would adversely affect its employment in food product applications.

In the functionalities recited in Table I, certain ones are similar and possibly complementary, so that the functionalities can be classified in categories, as follows:

| Group | Categories |
| --- | --- |
| A | #8 Foaming and #10 Film Forming |
| B | #1 Solubility and #3 Water Binding |
| C | #5 Cohesion/Adhesion |
| D | #2 Viscosity (thickening), #4 Gelation and #6 Elasticity |
| E | #7 Emulsification and #9 Fat Binding |
| F | #11 Fiber Forming |

GENERAL DESCRIPTION OF INVENTION

Solubility:

As noted above, one of the functions possessed by the canola protein isolate is solubility in aqueous media, such as water. The canola protein isolate is highly soluble in water in the presence of sodium chloride, being less in the absence of sodium chloride. The solubility of the protein changes under various pH levels, temperatures and sodium concentrations. Milk is a protein dispersion containing about 4 wt % protein dispersed in the aqueous phase. Liquid egg white, used in a variety of food applications, contains about 10 wt % egg proteins.

An example where such protein foods may be employed, at the appropriate concentration, is in a protein beverage.

Viscosity:

As noted above, one of the functions possessed by the canola protein isolate is the ability to act as a thickening agent for increasing viscosity in various food products. The canola protein isolate may be used as a replacement for gelatin, starches and xanthan gums commonly used for this purpose in, for example, soft cheeses, dressings, desserts, such as Jello® pudding, and sauces.

Water Binding:

Water binding properties of proteins are used in sausages and cakes to retain moisture in the cooked product. The canola protein isolate can be used to replace, partially or completely, the egg and animal-derived proteins commonly used for this purpose in these products.

Gelation:

The gelation properties of proteins is used in yoghurts, desserts and cheese as well as in various meat analogs, such as a bacon analog. Egg and milk proteins as well as gelatin, commonly used for this purpose, may be replaced, partially or completely, by the canola protein isolate provided herein.

Cohesion/Adhesion:

A variety of meats, sausage and pasta utilize egg protein and/or whey protein for these properties in their formulation to bind food components together and then to become coagulated upon being heated. The canola protein isolate can replace, partially or completely, such commonly used proteins and provide the required functions.

One application of these properties is a veggie burger, where egg white, commonly used to provide cohesion/adhesion of the ground-meat replacement can be replaced by the canola protein isolate. Other possibilities are meat loaf and meat balls, again as a replacement for egg protein.

Elasticity:

The canola protein isolate can replace, partially or completely, the egg and meat proteins in meats, used for these purposes. An example of the replacement of meat is in a veggie burger.

Emulsification:

Egg white, egg yolk and milk proteins are commonly used in sausages, meat analogs, simulated adipose tissue, cheese spreads and salad dressings for this property to achieve emulsification of fats and oils present in such products. The canola protein isolate may be used as a replacement, partially or completely, for the egg and milk proteins to provide the property.

Foaming:

The foaming properties of egg white and milk protein to provide a stable aerated structure, used in such products as ice cream, nougats, macaroons and meringues, may be reproduced by utilization of the canola protein isolate.

Fat Binding:

Egg and milk proteins have commonly been used in baked goods and doughnuts for fat binding properties. The canola protein isolate can replace such materials, partially or completely, and provide the required property. Such property may be employed in cookie mixes.

Film Forming:

The canola protein isolate can be used for its film-forming properties in breads and buns. Film forming properties also may be used to provide edible coatings on fruits, such as apples.

Fiber Forming:

The canola protein isolate can be formed into protein fibres by a fiber forming procedure, such as described in U.S. Pat. Nos. 4,328,252, 4,490,397 and 4,501,760. Such protein fibers may be used for their chewy texture in a variety of meat analogs, such as a meat snack analog, meatless breakfast sausage, a bacon analog, simulated adipose tissue, and a seafood analog, such as shrimp and crabmeat analogs, as well as other food products.

The canola protein isolate, therefore, provides a replacement for a variety of food ingredients (both proteinaceous and non-proteinaceous) to provide a broad spectrum of functionality not previously observed. The canola protein isolate replaces egg white, egg yolk, soy protein, xanthan gum, gelatin and milk protein in a variety of food products. The canola protein isolate is bland in taste and does not need to be used with strong flavours or spices.

EXAMPLES

The invention is illustrated by the following Examples:

Example 1

This Example illustrates preparation of the canola protein isolate samples for testing functionality of the protein.

'a' kg of commercial canola meal was added to 'b' L of 0.15 M NaCl solution at ambient temperature, agitated 'c' minutes to provide an aqueous protein solution having a protein content of 'd' g/L. The residual canola meal was removed and washed on a vacuum filter belt. The resulting protein solution was clarified by centrifugation to produce a clarified protein solution having a protein content of 'e' g/L following by the addition of 1 wt % Powdered Activated Carbon (PAC).

The protein extract solution or a 'f' aliquot of the protein extract solution from the PAC treatment step was reduced in volume on an ultrafiltration system utilizing 30,000 (A09-13) or 50,000 (A10-04, A10-05) dalton molecular weight cut-off membranes. The resulting concentrated protein solution had a protein content of 'g' g/L.

The concentrated solution at 'h' ° C. was diluted 1: 'i' into 4° C. tap water. A white cloud formed immediately and was allowed to settle. The upper diluting water was removed and was reduced in volume by ultrafiltration using a 3,000 dalton membrane by a volume reduction factor of 'j' to provide a protein concentration of 'k' g/L. The concentrate was added to the precipitated, viscous, sticky mass and the mixture was dried. The dried protein which was formed had a protein content of 'l'% of protein (Nx 6.25 d.b.). The product was given designation CPI 'm'.

The specific parameters 'a' to 'm' for five different samples of canola protein isolate (CPI) are set forth in the following Table II:

TABLE II

| m | a | b | c | d | e | f | g | h | i | j | k | l |
|---|---|---|---|---|---|---|---|---|---|---|---|---|
| A09-13 | 300 | 2000 | 30 | 20.4 | 18.8 | (1) | 219 | 20 | 10 | 12 | | 99.3 |
| A10-04 | 300 | 2000 | 30 | 28.4 | 27.6 | (1) | 186 | 28 | 10 | 11 | | 100.3 |
| A10-05 | 300 | 2000 | 30 | 27.7 | 21.9 | (1) | 281 | 27 | 15 | 21 | | 102.3 |
| A11-01 | 300 | 2000 | 30 | 23.7 | 20.7 | 400 | 200.2 | 32 | 15 | | 104.7 | 102.8 |
| BW-AL011-I21-01A | 1200 | 8000 | 30 | 24.5 | 17.8 | (1) | 284.7 | 31 | 10 | | 279.2 | 100.5 |

(1) All the protein extract solution was processed.

Example 2

This Example illustrates the utilization of the canola protein isolate in a trail mix cookie to illustrate fat binding in place of the egg white conventionally used.

Trail mix cookies were prepared from the formulation set forth in Table III:

TABLE III

| Ingredient | Weight (g) | Percentage (%) |
|---|---|---|
| White Sugar | 104.6 | 11.3 |
| Brown Sugar | 88.3 | 9.6 |
| Chunky Peanut Butter | 208.5 | 22.6 |
| Margarine | 50.3 | 5.4 |
| Vanilla | 2.9 | 0.3 |
| CPI A10-05 | 12.5 | 1.4 |
| Water | 91.6 | 9.9 |
| Rolled Oats | 241.3 | 26.2 |
| Baking Soda | 4.8 | 0.5 |
| Salt | 1.1 | 0.1 |
| Chocolate Chips | 70.6 | 7.7 |
| Raisins | 46.3 | 5.0 |
| Total | 922.8 | 100.0 |

White sugar, brown sugar and canola protein isolate powder were blended in a Hobart bowl mixer. Peanut butter and margarine were added and blended for 1.5 min. on speed 1. Vanilla and water next were added and blended for 1 min. on speed 1. The rolled oats, salt and baking soda were preblended and added to the Hobart bowl. the mixture was blended for 1 min on speed 1. Chocolate chips and raisins were added and blended for 30 sec. on speed 1. The dough was portioned onto a non-stick baking pan. The oven was preheated to 350° F. (175° C.) and the cookies baked for 16 minutes in the oven.

The trail mix cookies had a golden brown colour and a chunky, wholesome appearance similar to the control. The texture was chewy, soft and moist. No off odours and flavours were detected.

Example 3

This Example illustrates the utilization of the canola protein isolate in a light candy nougat to illustrate foaming in place of the egg white conventionally used.

A light candy nougat bar was prepared from the formulation set forth in the following Table IV:

TABLE IV

| Ingredient | Weight (g) | Percentage (%) |
|---|---|---|
| Sugar | 655.6 | 47.7 |
| Corn syrup, light | 338.4 | 24.6 |
| Water(1) | 226.3 | 16.5 |
| CPI A9-13 | 11.7 | 0.9 |
| Hydration Water(2) | 85.5 | 6.2 |

TABLE IV-continued

| Ingredient | Weight (g) | Percentage (%) |
|---|---|---|
| Chocolate chips | 56.7 | 4.1 |
| Salt | 0.5 | 0.04 |
| Total | 1374.7 | 100.0 |

Canola protein isolate, protein, water (2) and salt were whipped for 1 minute at speed 1 then 3 minutes at speed 3 using a whisk attachment in a Hobart bowl mixer and refrigerated until required. A rubber spatula, the inside of a large saucepan, and a cake pan were coated with a non-stick cooking spray. The sugar, corn syrup and water (1) were added to the saucepan and the mixture brought to a boil over medium heat. The mixture was covered and boiled for 3 minutes. The cover was removed and the sides of the saucepan were washed down using a pastry brush dipped in cool water. Cooking and stirring were continued until a temperature of 270° F. (130° C.) was reached. The temperature was measured by tilting the pot and measuring the temperature of the solution. The saucepan was removed from heat and the solution in the saucepan was cooled on a cooling rack to 260° F. (125° C.). The hot mixture was poured over the beaten protein mixture while blending using the paddle attachment at speed 1 for 3 minutes. Blending of the mixture was continued for an additional 16 minutes. Chocolate chips were added while blending for 1 minute at speed 1 to permit the chips to melt into mixture. The mixture was transferred to the cake pan and molded flat to ¾ inch height and frozen. The frozen sheet was cut into squares and frozen on a baking sheet. The frozen nougat squares were placed in a freezer bag for storage.

The nougat had a creamy appearance and a golden caramel colour. The texture was smooth, chewy and soft. The nougat had a sweet taste and no off odours. The candy nougat was comparable in flavour, colour, texture and odour characteristics to an egg-based control.

Example 4

This Example illustrates the utilization of the canola protein isolate in a baked meringue to illustrate foaming in place of the egg white conventionally used.

A baked meringue was prepared from the formulation set forth in the following Table V:

TABLE V

| Ingredient | Weight (g) | Percentage (%) |
|---|---|---|
| CPI A10-05 | 11.6 | 3.5 |
| Water | 85.2 | 26.0 |
| Salt | 0.4 | 0.1 |
| Berry Sugar (1) | 161.7 | 49.3 |
| Granulated Sugar (2) | 55.3 | 17.0 |

TABLE V-continued

| Ingredient | Weight (g) | Percentage (%) |
| --- | --- | --- |
| Cornstarch | 8.9 | 2.7 |
| Lemon juice | 4.7 | 1.4 |
| Total | 327.8 | 100.0 |

The canola protein isolate was dispersed in water in a Hobart bowl mixer. The mixture was blended at speed 3 for 2.0 minutes (stiff peaks). The berry sugar was gradually added while mixing at speed 3 for 2 minutes 45 seconds. The sides of the bowl then were scraped and the mixture blended for an additional 5 seconds.

The regular sugar and cornstarch were preblended manually and the resulting dry blend and the lemon juice were folded into the protein mixture with a rubber spatula (about 20 folds).

One tablespoon portions of the blend were placed onto a parchment lined baking sheet and baked in a 200° F. (95° C.) oven for 3 hours. The oven was turned off and the meringues left overnight in the oven.

The baked meringues exhibited a crisp, light, aerated texture and appearance.

Example 5

This Example illustrates the utilization of the canola protein isolate in a salad dressing to illustrate emulsification in place of whole egg or gums conventionally used.

A salad dressing was prepared from the formulation set forth in the following Table VI:

TABLE VI

| Ingredient | Weight (g) | Percentage (%) |
| --- | --- | --- |
| CPI A10-05 | 1.2 | 0.5 |
| Vinegar, 5% acetic acid | 31.0 | 14.0 |
| Canola oil | 147.0 | 66.2 |
| Sugar, fine granulated | 19.9 | 9.0 |
| Salt | 0.5 | 0.2 |
| Pepper | 0.4 | 0.2 |
| Water | 22.0 | 9.9 |
| Total | 222.0 | 100.0 |

Canola protein isolate, sugar, salt and pepper were placed in a Hobart bowl mixer. Vinegar and water were then added. The mixture was blended at speed 3 using the whisk attachment for 30 seconds. The sides and bottom of the bowl were then scraped. The mixture was blended at speed 3 for a further 5 minutes while slowly adding the oil.

The emulsified salad dressing had a light golden colour typical of commercial vinaigrette dressing. Pepper particles were suspended throughout the emulsion. The dressing had an acceptable vinegar taste and a light aerated texture. No off odours and off flavours were detected.

Example 6

This Example illustrates the use of the canola protein isolate in glazed hot cross buns in place of egg white or whole egg conventionally used and illustrating film-forming properties.

Glazed hot cross buns were prepared from the formulation set forth in the following Table VII:

TABLE VII

| Ingredient | Batch Produced (g) | Percentage (%) |
| --- | --- | --- |
| Bun Formulation | | |
| Dawn Hot Cross Bun Mix | 340.8 | 49.5 |
| Water | 170.4 | 24.8 |
| Yeast (instant rising) | 6.3 | 0.9 |
| Currants | 85.2 | 12.4 |
| Mixed Fruit (glace cake mix) | 85.2 | 12.4 |
| Total | 687.9 | 100.0 |
| Glaze Formulation | | |
| CPI A10-02 | 12.0 | 21.3 |
| Salt | 0.3 | 0.7 |
| Water | 44.0 | 78.0 |
| Total | 56.3 | 100.0 |

The hot cross bun mix, yeast and water were placed in a Hobart bowl mixer and mixed with the paddle attachment at speed 1 for 3 minutes. The dough was kneaded on a cutting board until firm, not sticky and elastic. Currants and mixed fruit were weighed in a bowl and 1 tsp of flour was added. The fruit and flour were manually mixed to lightly coat the fruit surface. The fruit next was added to the dough in the Hobart bowl mixer and mixed at speed 1 for 1 minute. The paddle was removed and the dough slightly rounded. The dough was covered with a tea towel and left to ferment for 20 minutes. The dough was scaled on a cutting board into 50 g portions, covered with a tea towel and left to rest for 15 minutes. The dough was rounded and panned into a cake pan, the dough was covered with a tea towel and proofed for 90 minutes by placing the pan on a warm stovetop.

A protein wash was prepared by mixing the canola protein isolate, salt and water. The surface of the dough was coated four times with protein washes using a pastry brush. The dough then was baked at 380° F. (195° C.) for 17 minutes.

The surface of the hot cross buns was golden coloured and shiny with a firm outer layer. No off odours and flavours were detected.

Example 7

This Example illustrates the use of the canola protein in glazed dinner rolls in place of egg white conventionally used and illustrating film-forming properties.

Glazed dinner rolls were prepared from the formulation set forth in the following Table VIII:

TABLE VIII

| Ingredient | Batch Produced (g) | Percentage (%) |
| --- | --- | --- |
| Dinner Roll Formulation | | |
| Water, tap | 265.0 | 33.0 |
| All Purpose Flour | 430.0 | 53.5 |
| Skim milk powder | 9.9 | 1.2 |
| Sugar | 46.6 | 5.8 |

TABLE VIII-continued

| Ingredient | Batch Produced (g) | Percentage (%) |
|---|---|---|
| Salt | 5.1 | 0.6 |
| Butter | 40.0 | 5.0 |
| Yeast (Instant Active Dry) | 7.2 | 0.9 |
| Total | 803.8 | 100.0 |
| Glaze Formulation | | |
| CPI A10-05 | 12.0 | 21.3 |
| Salt | 0.3 | 0.7 |
| Water | 44.0 | 78.0 |
| Total | 56.3 | 100.0 |

Tepid water was added to a bread pan (Westbend Automatic Bread and Dough Maker). The flour, milk powder, sugar and salt were added to the bread pan and the bread pan was gently tapped to level the ingredients. The butter was cut into 4 pieces and placed in each corner of the bread pan. A well was formed in the dry ingredients (preventing sugar exposure to yeast) and the yeast was added into the well. The bread machine was set to the "Dough" setting (1 hour, 20 minutes) and the machine started and locked. When done, the dough was removed and placed on a floured cutting board, covered and let rest for 15 minutes. The dough was shaped into rolls (18), which were placed in a baking pan, covered and allow to rise (to twice its size) in a warm draft-free environment (60 minutes).

A protein wash was prepared by mixing the canola protein isolate, salt and water. The tops of the rolls were brushed four times with the protein wash using a pastry brush. The rolls then were baked at 350° F. (195° C.) for 18 minutes.

The surface of the dinner rolls was shiny, glossy and golden brown with a firm outer layer. No odours and flavours were detected.

Example 8

This Example illustrates the use of the canola protein isolate in a caramel sauce, in place of the corn starch conventionally used, and illustrating the viscosity properties of the isolate.

A caramel sauce was prepared from the formulation set forth in the following Table IX:

TABLE IX

| Ingredient | Batch Size Produced (g) | Percentage (%) |
|---|---|---|
| Evaporated milk, 2% m.f. | 407.6 | 66.1 |
| CPI A10-05 | 6.0 | 1.0 |
| Brown Sugar | 75.6 | 12.3 |
| White Sugar | 106.3 | 17.2 |
| Margarine | 15.0 | 2.4 |
| Vanilla extract, pure | 5.9 | 1.0 |
| Total | 616.4 | 100.0 |

Evaporated milk and the canola protein isolate were combined in a saucepan and stirred with a rubber spatula until dissolved. Margarine, vanilla, white sugar and brown sugar were added and the mixture stirred with a whisk and cooked over medium heat until the mixture reached 85° C. (185° F.) and then held for 20 minutes.

The caramel sauce looked creamy, smooth and had a golden caramel colour and light caramel odour. The texture was smooth and uniform similar to a control caramel sauce thickened with cornstarch. The sauce had a rich, sweet, caramel flavour with a light buttery taste.

Example 9

This Example illustrates the use of the canola protein isolate in a mayonnaise in place of the egg yolk conventionally used and illustrating emulsification.

A mayonnaise was prepared from the formulation set forth in the following Table X:

TABLE X

| Ingredient | Batch Produced (g) | Percentage (%) |
|---|---|---|
| CPI A10-04 | 2.6 | 1.0 |
| Skim milk powder, low temp. | 1.8 | 0.7 |
| Water | 38.3 | 14.6 |
| Mustard powder | 1.6 | 0.6 |
| Sugar, white fine granulated | 4.4 | 1.6 |
| Canola oil (1) | 38.6 | 14.7 |
| Vinegar, 5% acetic acid | 10.9 | 4.2 |
| Canola oil (2) | 159.4 | 60.8 |
| Lemon Juice | 4.8 | 1.8 |
| Total | 262.4 | 100.0 |

The canola protein isolate and skim milk powder were placed in a Hobart bowl mixer. The water was added to the Hobart bowl and the blend was manually mixed to wet the dry ingredients. The sugar and mustard powder were added to the mixed ingredients and blended for 2 minutes using the whisk attachment at speed 3. The blend was stopped and the sides and bottom of the bowl were scraped. A first amount of canola oil (1) was added and mixed for 30 seconds. The bowl was scraped. The vinegar was added and mixed for 30 seconds. The bowl was scraped. The second amount of canola oil (2) was placed into a sealed Ziploc style bag and a pinhole-sized opening was cut in one corner of the bag. The canola oil and lemon juice were added simultaneously while blending for 5 minutes at speed 3. The bowl was scraped and the mixture blended for an additional 30 seconds at speed 3.

The mayonnaise had a creamy, smooth mouthfeel and a light pale yellow colour. The mayonnaise was spreadable with a knife and had a texture similar to the control product made with egg yolk. No off odours and flavours were detected.

Example 10

This Example illustrates the use of the canola protein isolate in cake doughnuts in place of whole egg conventionally employed and to illustrate the reduced fat absorption property.

Cake doughnuts were prepared from the formulation set forth in the following Table XI:

TABLE XI

| Ingredient | Weight (g) | Percentage (%) |
|---|---|---|
| All purpose flour | 480.6 | 47.0 |
| Sugar, fine granulated | 217.7 | 21.3 |
| Baking powder | 16.2 | 1.6 |
| Salt | 3.0 | 0.3 |
| Cinnamon | 2.3 | 0.2 |
| Butter, salted | 23.6 | 2.3 |
| CPI A9-13 | 12.3 | 1.2 |

TABLE XI-continued

| Ingredient | Weight (g) | Percentage (%) |
|---|---|---|
| Water | 90.3 | 8.8 |
| Milk, 2% | 176.5 | 17.3 |
| Total | 1022.5 | 100.0 |

Sugar, baking powder, salt, cinnamon, canola protein isolate and half the flour were placed into a Hobart mixing bowl. The ingredients were dry blended with a fork until all dry ingredients were evenly dispersed. Butter, water and milk next were added to the bowl. The mixture was blended for 30 seconds at speed 1 using the paddle attachment. The bottom and sides of the bowl and the paddle were scraped and the mixture blended for 2 minutes at speed 2. During mixing the blender was stopped after 1 minute and the bottom and sides of the bowl and paddle were scraped. The remaining flour was added while blending at speed 1 for 1 minute.

The resulting dough was placed on a floured cutting board, kneaded into a ball, the surface of the ball floured and then rolled flat to half inch thickness. The dough sheet was cut with a doughnut cutter and the doughnuts and holes were placed on parchment paper.

A fryer (SEB Safety Super Fryer Model 8208) was preheated to the set temperature of 374° F. (190° C.). The doughnuts were placed in the fryer basket and fried for 60 seconds each side. The fried doughnuts were placed on paper towel layered grilling racks.

The doughnuts had a golden brown colour and a smooth, even, exterior surface. The texture was cake-like with a slightly crispy surface. The doughnuts had a sweet cinnamon flavour and exhibited no off flavours or odours as compared to the control.

Doughnuts were prepared as described above utilizing canola protein isolate A10-05 and the fat content of the doughnuts was compared to doughnuts prepared using egg rather than the canola protein isolate. The results obtained are set forth in the following Table XII:

TABLE XII

| | Fat % | | |
|---|---|---|---|
| Protein | Raw Doughnut | Fried Doughnut | Difference |
| Whole shell egg | 5.0 | 22.2 | +17.2 |
| Whole dry egg | 5.0 | 22.9 | +17.9 |
| 100% Puratein A10-05 | 4.0 | 16.8 | +12.8 |
| 50/50 Puratein and whole dry egg | 3.0 | 17.2 | +14.2 |
| 75/25 Puratein and whole dry egg | 4.4 | 16.4 | +12.0 |

These results show a lower fat absorption using the canola protein isolate when compared with whole egg products.

Example 11

This Example illustrates the use of the canola protein isolate in battered vegetables and fish in place of whole egg conventionally used, illustrating adhesion properties.

Battered vegetables and fish were prepared from the formulation set forth in the following Table XIII:

TABLE XIII

| Ingredient | Weight (g) | Percentage (%) |
|---|---|---|
| All purpose flour | 128.0 | 32.3 |
| Baking powder | 2.5 | 0.6 |
| Sugar | 4.8 | 1.2 |
| Salt | 2.7 | 0.7 |
| Milk, skim | 182.6 | 46.0 |
| CPI A9-13 | 6.2 | 1.6 |
| Water | 45.8 | 11.5 |
| Shortening | 24.1 | 6.1 |
| Canola oil for frying | — | — |
| Total | 396.7 | 100.0 |

Onions were peeled and sliced into ¼ inch slices and separated into rings. Mushrooms and zucchini were washed and then zucchini cut into ¼ inch slices. Fish was cut into 2 inch strips.

Flour was manually mixed with protein, baking powder, salt and sugar. The mixture was dry blended thoroughly using a fork. Shortening was melted in a microwave oven for 45 seconds at level 8: Milk, water and melted shortening were combined and added to the dry ingredients. The mixture was blended manually until smooth.

The vegetable and fish pieces were dipped into batter. A fryer basket was lowered into canola oil preheated to 374° F. (190° C.) and the battered pieces placed into the fryer oil. Each side was fried (onion rings and fish—30 to 45 seconds each side, zucchini and mushrooms—1 minute each side) and then removed from the fryer. The fried foods were placed onto paper towel to absorb oil.

Freshly battered and fried vegetable and fish pieces were golden brown coloured and crisp. The batter adhered to the pieces well. The battered products and control products made using whole egg were similar in sensory and handling characteristics. No off odours or flavours were detected.

Example 12

This Example illustrates the utilization of the canola protein isolate in forming texturized or spun canola protein.

The fiber forming properties of canola protein isolate was illustrated in the preparation of texturized canola protein. The texturized canola protein was made using canola protein isolate made by wetting spray dried isolate using the concentrations set forth in the following Table XIV:

TABLE XIV

| Ingredient | Amount (g) | Percentage (%) |
|---|---|---|
| CPI A11-01 | 20.0 | 58.0 |
| Water | 14.5 | 42.0 |
| Total | 34.5 | 100.00 |

Spray dried canola protein isolate and water were placed in a bowl. The protein was dispersed by manually stirring the solution with a spoon until all the protein was wet. This liquid mixture was added to a 5 cc syringe and then extruded into water held between 95° and 99° C. Long spaghetti-like fibers formed along the surface of the water. The long protein strands were manually turned over in order to facilitate even heat treatment to both sides of the product. The strands were removed from the water and the excess water was removed using absorbent towels.

The canola protein isolates formed long elastic fibers, golden yellow in colour.

Example 13

This Example illustrates the solubility of the canola protein isolate.

10 g of dry canola protein isolate BW-AL011-I21-01A, prepared as described in Example 1, was combined with 400 ml of distilled water in a 600 ml beaker to prepare a 2.5 wt % protein solution. The protein solution was blended by homogenizing for 2 minutes at 4500 rpm, until a smooth slurry was formed. The pH of the protein solution was determined and the solution split into equal volumes for pH adjustment, one for alkaline and the other for acid adjustment.

The pH of the protein solution was adjusted to 4.0, 4.5, 5.0, 5.5, 6.0, 6.5, 7.0, 7.5 and 8.0 with 0.1 M NaOH or 5% HCl. A small sample of each pH adjusted solution was collected for protein determination. 30 ml of the pH adjusted solutions were poured into 45 ml centrifuge vials and centrifuged for 10 minutes at 10,000 rpm. After centrifugation, the supernatant protein concentration for each of the pH adjusted samples was determined.

The % solubility of the protein was determined from the relationship:

$$\% \text{ Solubility} = \frac{\% \text{ protein after centrifugation}}{\% \text{ protein before centrifugation}} \times 100$$

The results obtained are set forth in the following Table XV:

TABLE XV

| pH | Average % Protein before Centrifugation (±0.2%) | Average % Protein after Centrifugation (±0.2%) | Average % Solubility |
|---|---|---|---|
| 4.0 | 2.05 | 1.80 | 87.80 |
| 4.5 | 2.04 | 1.94 | 95.01 |
| 5.0 | 1.92 | 1.79 | 93.23 |
| 5.5 | 1.49 | 1.33 | 89.26 |
| 6.0 | 1.18 | 1.04 | 88.14 |
| 6.5 | 1.73 | 1.28 | 73.99 |
| 7.0 | 1.81 | 1.42 | 78.45 |
| 7.5 | 1.78 | 1.46 | 82.03 |
| 8.0 | 1.90 | 1.81 | 95.26 |

As may be seen from the results in Table XV, the canola protein isolate was quite soluble at all pH's tested, but has least solubility around neutral pH (6.5 to 7.0).

Example 14

This Example illustrates the foaming properties of the canola protein isolate.

3.75 g of canola protein solution BW-AL011-I21-01A, prepared as described in Example 1, was placed into a 150 ml beaker. 60 ml of 0.075 M NaCl solution was added to the protein, by initially making a paste to dissolve the protein with a few ml of liquid. The mixture was mixed using a magnetic stir bar for 10 minutes. The pH of the solution was adjusted to 7.00 with 0.1 M NaOH, and the solution stirred for another 10 minutes. The pH was re-adjusted to 7.00 and the volume of liquid was brought up to 75 ml with the required amount of 0.075M NaCl to yield a 5% w/v protein solution. The 75 ml of solution was poured into a Hobart Mixer bowl and the combined weight of solution, bowl and whisk attachment was recorded. The protein solution was whipped on speed 3 for 5 minutes.

Sufficient foam was gently scooped out to fill two tared 125 ml measuring cups using a rubber spatula. Excess foam was scraped off using the flat end of a large knife to level the top of the foam even with the top of the measuring cup and the weight of the foam was recorded. The foam was gently returned to the mixing bowl and whipped for another 5 minutes. This procedure then was repeated. The foam was gently returned to the mixing bowl and whipped for a further 5 minutes for 15 minutes in all. The procedure again was repeated.

The overrun was calculated from the following equation:

$$\% \text{ Overrun} = \frac{(\text{wt 125 mL protein}) - (\text{wt 125 ml foam})}{(\text{wt 125 ml foam})} \times 100$$

The stability of the foam was also tested. The protein solution was prepared in the same manner as described for the % overrun measurement, except the protein solution was whipped for 15 minutes on level 3. Using a rubber spatula, the foam was carefully transferred to into a long-necked 1 L funnel placed on the tope of a 250 ml graduated cylinder. A small amount of quartz wool was placed in the top of the funnel spout prior to transferring the foam to prevent the foam from draining while still allowing drainage of the liquid.

The volume of liquid that was collected in the graduated cylinder at 5, 10 and 15 minutes was measured. The volume held in the wool was added to the final volume.

The experiments were repeated for comparison with egg albumen, a whey protein isolate (from NZHP) and a soy protein isolate (from ADM). The results obtained are set forth in the following Tables XVI, XVII, XVIII and XIX:

TABLE XVI pH of Protein Solution after Stirring

| Protein Sample | pH after 10 minutes of stirring | pH after 20 minutes of stirring |
|---|---|---|
| Egg Albumen | 6.88 | 6.95 |
| Whey | 6.49 | 6.98 |
| Soy | 7.13 | 7.01 |
| Puratein | 5.73 | 6.94 |

TABLE XVII

Average weight of Foam

| Protein Sample | 5 minutes (g) | 10 Minutes (g) | 15 Minutes (g) |
|---|---|---|---|
| Egg Albumen | 10.16 | 6.42 | 6.57 |
| Whey | 17.35 | 13.48 | 9.76 |
| Soy | 63.26* | 58.53* | 49.74* |
| Puratein | 11.86 | 10.20 | 9.73 |

*Only one weight could be obtained because did not whip well.

TABLE XVIII

Average % Overrun

| Protein Sample | 5 minutes (%) | 10 minutes (%) | 15 Minutes (%) |
|---|---|---|---|
| Egg Albumen | 1130.32 | 1847.04 | 1802.59 |
| Whey | 620.46 | 827.30 | 1180.74 |
| Soy | 97.60 | 113.57 | 151.31 |
| Puratein | 953.96 | 1125.49 | 1184.69 |

* Assume weight of 125 ml of protein solution is 125 g.

TABLE XIX

Volume of Protein Solution Collected in Funnel

| Protein Sample | Drainage at 5 Min (ml) | Drainage at 10 Min (ml) | Drainage at 15 Min (ml) |
|---|---|---|---|
| Egg Albumen | 0.0 | 1.0 | 5.0 |
| Whey | 2.0 | 13.0 | 24.0 |
| Soy | N/A* | N/A* | N/A* |
| Puratein | 3.0 | 14.5 | 33.5 |

*The soy did not foam well. It plugged the wool with a gelatinous substance when poured into the funnel, and didn't drain out. Assume all 75 ml would drain out immediately.

As may be seen from the results of these Tables, the canola protein isolate created a nice foam. There was very little difference in the % overrun between 10 and 15 minutes for egg albumen and the canola protein isolate, indicating that these proteins reached their maximum foaming capacity in a shorter amount of time. The considerable amount of drainage from the foam after 15 minutes indicated a lack of foam stability for the canola protein isolate.

Example 15

This Example illustrates the oil holding capacity of the canola protein isolate.

The recipe set forth in Table XX was used to prepare the emulsion:

TABLE XX

| Ingredient | Percentage of Recipe (%) | Weight Added (g) |
|---|---|---|
| Protein | 0.11 | 0.50 |
| Vinegar (No Name 5% acetic acid) | 12.27 | 55.22 |
| Canola Oil (CSP Foods) | Unknown | Unknown |
| Sugar (Rogers fine granulated | 9.10 | 4.095 |
| Salt (Sifto) | 0.27 | 1.22 |
| Distilled Water | 11.65 | 52.43 |

The sugar, salt and canola protein isolate, BW-AL011-I21-01A prepared as described in Example 1, were dry blended in a 600 ml beaker. The water and vinegar were mixed and added to the protein a few ml at a time. After each addition, the protein solution was hand blended to create a paste initially that was slowly diluted into a fully suspended solution. The mixture was then placed on a magnetic stirrer and blended for 5 minutes. A 2000 ml beaker was filled with canola oil and the weight recorded. A suction hose was placed in the oil.

The dispensing end of the hose was attached to a homogenizer and the pump was primed with oil using setting #1 to dispense approximately 40 to 50 m/min. At the same time, the homogenizer (Silverson LHRT) was turned to 5000 rpm and the pump switched on to disperse the oil. The point at which the emulsion was most viscous was visually observed. At the point of inversion, the pump and homogenizer then were switched off immediately. The end of the suction hose was pinched with a clip to keep the oil in it and the weight of oil left in the 200 ml beaker was determined.

The experiment was repeated using egg yolk, xanthan gum (from Kelco Biopolymers) and soy protein isolate (from ADM). The average oil holding capacity of the emulsions were determined for the various protein sources and the results obtained are set forth in the following Table XXI:

TABLE XXI

| Sample | Weight of Oil Added (g) | Volume of Oil Added (ml) | ML oil/100 mg protein |
|---|---|---|---|
| Yolk | 163.07 | 146.93 | 58.77 |
| Xanthan gum | 88.09 | 79.37 | 31.75 |
| Soy | 91.50 | 82.44 | 32.98 |
| Puratein | 175.63 | 158.23 | 63.29 |

As may be seen from the results set forth in Table XXI, the canola protein isolate performed significantly better than xanthan gum and soy for oil holding capacity and that the canola protein isolate performed very similar to egg yolk.

SUMMARY OF DISCLOSURE

In summary of this disclosure, the present invention provides a variety of food products where proteins used to provide a wide variety of functionalities are replaced, wholly or partially, by a highly pure canola protein isolate. Modifications are possible within the scope of the invention.

What we claimed is:

1. A method of forming a food composition, which comprises:
   extracting a canola oil seed meal with an aqueous salt solution to form an aqueous protein solution,
   reducing the volume of the aqueous protein solution using ultrafiltration membranes to provide a concentrated protein solution having a protein content in excess of about 200 g/L,
   diluting the concentrated protein solution into chilled water having a temperature of below about 15° C. to form a cloud of protein micelles,
   allowing the protein micelles to settle to form a viscous, sticky mass and a supernatant,
   concentrating the supernatant,
   mixing the concentrated supernatant with the viscous, sticky mass,
   drying the resulting mixture to provide a substantially undenatured canola protein isolate having a protein content of at least about 90 wt %, and
   providing a food composition comprising a foodstuff and said substantially undenatured canola protein isolate as a component providing functionality in said food composition.

2. The method of claim 1, wherein said protein isolate contributes to the food composition as soluble protein or to provide foaming, film forming, water binding, cohesion, thickening, gelation, elasticity, emulsification, fat binding or fibre forming functionality.

3. The method of claim 1, wherein said protein isolate is incorporated in said food composition in substitution for egg white, milk protein, whole egg, meat fibres, or gelatin.

* * * * *